Dec. 17, 1957 R. E. FRINK 2,816,992
CIRCUIT INTERRUPTERS
Filed Nov. 26, 1954 6 Sheets-Sheet 1
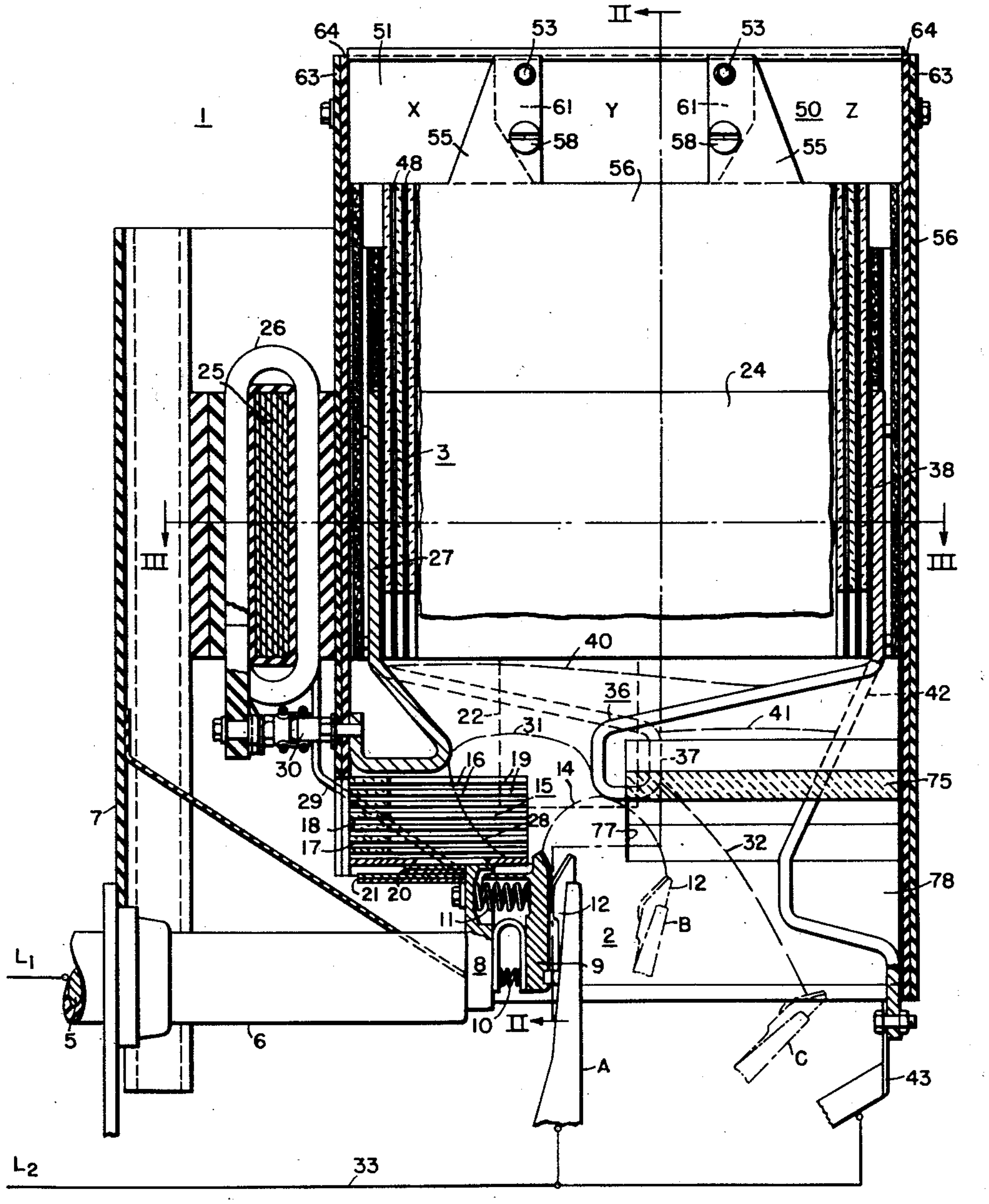
Fig. I.
WITNESSES
Edwin E. Bassler
W. R. Crout
INVENTOR
Russell E. Frink
BY
Ralph H. Swingle
ATTORNEY Dec. 17, 1957 R. E. FRINK 2,816,992

CIRCUIT INTERRUPTERS

Filed Nov. 26, 1954 6 Sheets-Sheet 2

Dec. 17, 1957 R. E. FRINK 2,816,992

CIRCUIT INTERRUPTERS

Filed Nov. 26, 1954 6 Sheets-Sheet 3

Dec. 17, 1957 R. E. FRINK 2,816,992

CIRCUIT INTERRUPTERS

Filed Nov. 26, 1954 6 Sheets-Sheet 4

Dec. 17, 1957 R. E. FRINK 2,816,992

CIRCUIT INTERRUPTERS

Filed Nov. 26, 1954 6 Sheets-Sheet 6

United States Patent Office 2,816,992

Patented Dec. 17, 1957

2,816,992

CIRCUIT INTERRUPTERS

Russell E. Frink, Forest Hills, Pa., assignor to Westinghouse Electric Corporation, East Pittsburgh, Pa., a corporation of Pennsylvania Application November 26, 1954, Serial No. 471,329

18 Claims. (Cl. 200—147)

This invention relates to circuit interrupters in general, and, more particularly, to arc-extinguishing structures therefor.

A general object of my invention is to provide an improved arc-extinguishing structure for a circuit interrupter which will render improved operation and greatly increase the interrupting ability of the interrupter.

Another object of my invention is to provide an improved arc-extinguishing structure in a more compact space than interrupters of the same capacity of the prior art.

Still a further object of my invention is to provide an improved circuit interrupter of compact size and to utilize therein two adjoining arc chutes in an improved manner.

Still a further object of my invention is to provide an improved circuit interrupter utilizing a pair of adjoining arc chutes in which means are provided to deflect the exhaust gases exhausting away from one arc chute in substantially the opposite direction from the direction taken by the exhaust gases issuing from the other arc chute.

Another object of my invention is to provide an improved circuit interrupter of the type establishing two serially related arc portions and to provide improved arc-extinguishing means in a compact space for effectively causing the rapid extinction of the two arc portions.

Still a further object is to provide an improved circuit interrupter of the type specified in the immediately preceding paragraph, in which each arc portion has its own arc chute structure.

Yet a further object of my invention is to provide an improved circuit interrupter involving a pair of adjoining arc chutes, in which a novel U-shaped arc horn is employed to effect a very rapid lengthening of the established arc into two relatively long arc portions.

Still a further object of my invention is to provide an improved circuit interrupter of the type having a U-shaped magnet portion, in which a pair of adjoining arc chutes are incorporated, whereby both arc chutes may take advantage of the same magnetic field passing between pole plates.

Another object of my invention is to provide an improved circuit interrupter of the type using an H-type magnet in which are disposed on opposite sides of the bight or central core portion of the magnet two pairs of adjoining arc chutes, to effect thereby a considerable lengthening of the establishing arc in a compact space, while at the same time each pair of arc chutes utilizes the same magnetic field.

A further object of my invention is to provide an improved circuit interrupter in which the amount of iron required for the magnet is reduced, and yet better arc control is obtained.

Further objects and advantages will readily become apparent upon reading the following specification, taken in conjunction with the drawings, in which:

Fig. 1 is a vertical sectional view taken substantially along the line I—I of Fig. 2 illustrating a circuit interrupter embodying the principles of my invention, and the contact structure being shown in full lines in the closed-circuit position;

Figure 3:
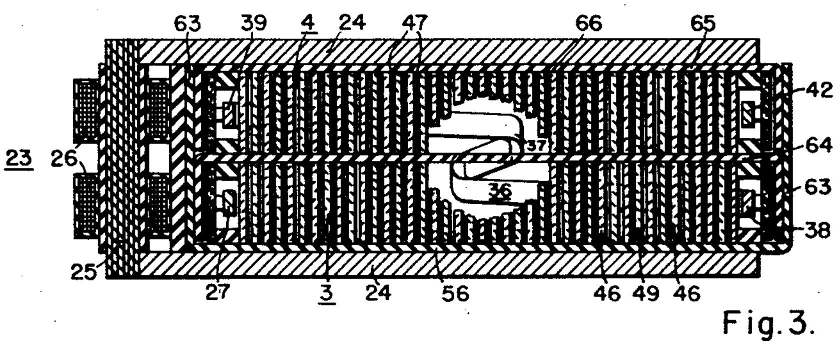
Fig. 3 is a plan sectional view taken substantially along the line III—III of Fig. 1.
Figure 2:
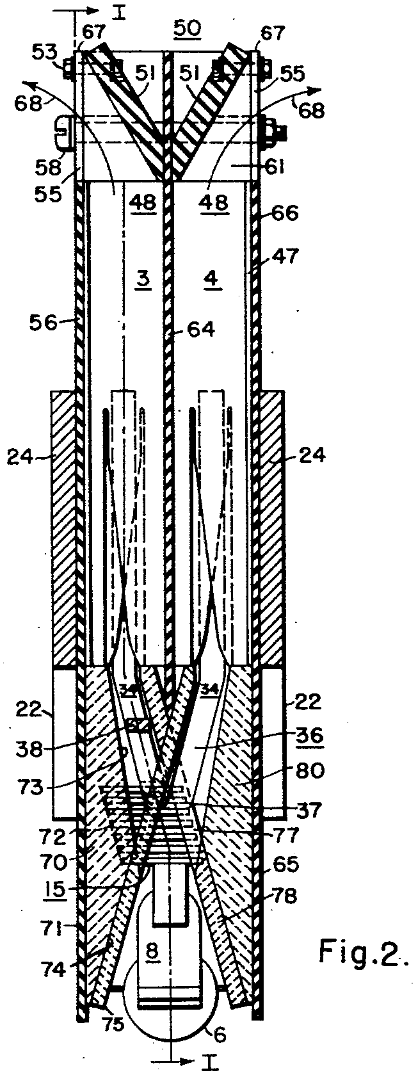
Fig. 2 is a substantically vertical sectional view taken along the line II—II of Fig. 1.

Referring to the drawings, and more particularly to Figs. 1–3 thereof, the reference numeral 1 generally designates a circuit interrupter including cooperating contact structure 2 and a pair of adjoining, or side-by-side, arc chutes 3, 4, which are utilized to extinguish the establishing arcs.

The upper terminal stud in the circuit interrupter of Fig. 1 is designated by the reference numeral 5, and includes a flanged insulating sleeve 6 passing through a supporting panel 7 and terminating at its right-hand end with a stationary contact structure 8. The stationary contact structure 8 includes a stationary contact 9 resiliently biased by compression springs 10, 11 to provide the requisite contact pressure in the closed-circuit position of the interrupter, as shown, and to insure the establishment of the initially formed arc at the upper tip portions of the cooperating contacts 9, 12. The cooperating movable contact 12 is pivotally mounted about the lower terminal stud of the interrupter 1, not shown, and is adapted to swing around its pivotal point in a clockwise direction, as viewed in Fig. 1, to effect the opening of the circuit in a manner well known by those skilled in the art.

As shown, the line connection $L_1$ is made to the upper terminal stud 5, whereas the other line connection $L_2$ is electrically connected to the movable contact arm 12, as shown.

Figure 4:
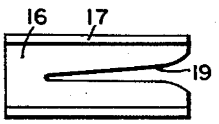
Fig. 4 is a plan view of one of the ceramic plates utilized in the transfer arc-extinguishing means of Fig. 1.

During the opening operation of the interrupter, the movable contact 12 moves from the position "A" to the position "B" thereby establishing a single arc, designated by the reference numeral 14 in Fig. 1. Disposed adjacent to the arc portion 14 is a transfer arc-extinguishing means, generally designated by the reference numeral 15, and comprising a plurality of spaced ceramic plates 16. The ceramic plates 16 are spaced from one another by asbestos rope spacers 17 extending lengthwise down the side edges of the plates 16, as indicated in Fig. 4, thereby providing exhaust passages 18 between the plates 16. Each plate 16, as shown in Fig. 4, has a tapered slot 19, into which one portion of the arc 14 is moved.

To facilitate the entrance of the arc 14 into the plates 16, constituting the transfer arc-extinguishing means 15, a plurality of magnetic plates 20, 21 are employed, being positioned adjacent the lower end of the transfer arc-extinguishing means 15, as shown in Fig. 1. United States Patent 2,632,075, issued March 17, 1953 to Herbert L. Rawlins, Robert C. Dickinson, and myself, and assigned to the assignee of the instant application, describes the construction and function of the plates 20, 21 in detail.

As well known by those skilled in the art, the disposition of magnetic material adjacent an arc causes its attraction thereto, and consequently in the interrupter 1 of Fig. 1, the arc 14 moves within the transfer arc-extinguishing means 15 and into the several slots 19 of the plates 16 to become extinguished.

The U-shaped magnet structure 23 (Fig. 3) of the interrupter 1 includes a pair of opposed pole plates 24 and an intermediately disposed core 25, encircled by a pair of electrically parallel blowout coils 26, which are connected between the stationary contact structure 8 and the rear arc horn 27 of the near arc chute 3, as viewed in Fig. 1. Consequently, upon the extinction of the arc portion 28 extending between the arc horn 27 and the stationary contact 9 the blowout coils 26 are thereby inserted into the circuit, and the electrical circuit then comprises line $L_1$, upper terminal stud 5, strap connection 29, coils 26 in electrical parallel, disconnecting switch structure 30, rear arc horn 27, arc portion 31, arc portion 32 and through movable contact arm 12 (which at this time is located at position "C") through connection 33, connecting the lower terminal stud of the interrupter 1 to the other line connection $L_2$.

As is well understood by those skilled in the art, upon the energization of the two electrically parallel blowout coils 26 a magnetic field is set up within the U-shaped magnet structure 23 to cause an intense magnetic field between the pole plates 24, and transversely across the adjoining arc chutes 3, 4 (Fig. 3).

Disposed adjacent the entrance portions 34 (Fig. 2) of each chute 3, 4 is a substantially U-shaped arc horn, generally designated by the reference numeral 36, and containing an intermediately disposed loop portion 37, as shown more clearly in Figs. 1 and 3 of the drawings. The arc horn 36 has one end thereof 38 leading to the front side of the near arc chute 3, and has the other end 39 leading to the rear end of the far arc chute 4, as viewed in Figs. 1 and 3.

When the arc portions 31, 32 engage the intermediately disposed loop portion 37, being assisted in this action by the depending pole plates 22 as described in U. S. Patent 2,616,007, issued October 28, 1952 to Russell E. Frink and Robert C. Dickinson, this will split up the initially established arc into two serially related arcs, one of which is designated by the reference numeral 40 and moves up within the near arc chute 3 between the arc horns 27 and 38, and another arc 41 established between the arc horn 39 and a front arc horn 42, which is electrically connected by a strap connection 43 to the lower terminal stud 33 of the interrupter 1.

Figure 5:
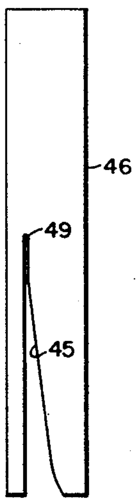
Fig. 5 is an elevational view of one of the insulating plates used in the adjoining arc chutes of the circuit interrupter of Fig. 1.

As a result, the arc portions 40, 41 move upwardly within the arc chutes 3, 4 respectively and within the slots 45 provided by a plurality of ceramic plates 46, the configuration of which is more readily apparent from an inspection of Fig. 5 of the drawings. The slotted ceramic plates 46 are spaced from each other by spacers 47 thereby providing exhaust passages 48 between the several plates 46 through both arc chutes 3 and 4. The arcs 40, 41 are moved to the closed ends 49 of the several slots 45 whereby arc extinction occurs.

The insulating or ceramic arc-extinguishing chutes 3, 4 provide spaced, transverse insulating plate portions which compel the arc to assume a zig-zag shape within the insulating arc chutes 3, 4. It, of course, would not need to assume the particular construction shown.

To recapitulate, during the extinction process in which both arc chutes 3, 4 are utilized, the circuit extends from line connection $L_1$, through terminal stud 5, strap connection 29, both coils 26 in electrical parallel, disconnecting contact structure 30, rear arc horn 27 of arc chute 3, through arc 40 to front arc horn 38, through the loop portion 37 to the rear arc horn 39 of arc chute 4, through arc 41 to front arc horn 42, through strap connection 43 and connection 33 to the other line connection $L_2$.

Figure 6:
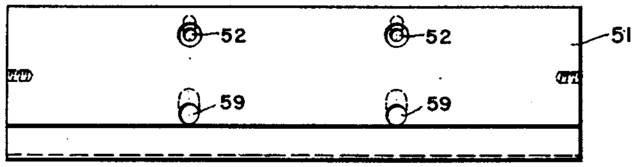
Figs. 6 and 7 are side elevational and end views of one of the deflecting plates utilized at the exhaust end of the circuit interrupter shown in Fig. 1.
Figure 7:
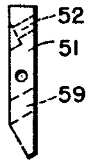

To insure, during the extinction process, that the exhaust arc gases passing upwardly out of the arc chutes 3, 4 within the exhaust passages 48 are diverted from one another, to prevent possible flashover over the exhaust ends of the arc chutes 3, 4 deflecting means 50 is utilized. In this instance, the deflecting means comprises a pair of diagonally positioned barrier or deflecting plates 51 having a configuration more clearly shown in Figs. 6 and 7 of the drawings. The barrier plates 51 have mounting apertures 52, through which extend mounting bolts 53, which also extend through apertures 54 provided in upper tongue portions 55 disposed at the upper end of the U-shaped insulating casing 56, as shown more clearly in Fig. 10 of the drawings.

Figure 8:
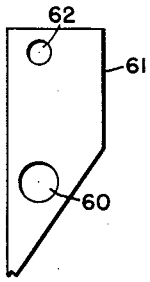
Figs. 8 and 9 are side elevational and end views of one of the separators used in conjunction with the arc chutes of Fig. 1.
Figure 9:
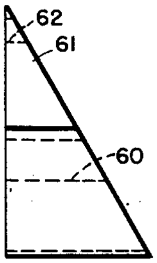

The tongue portions 55 of the casing 56 also contain apertures 57 through which extend bolts 58. The bolts 58 extend through apertures 59 provided in the barrier plates 51, and in addition pass through apertures 60 provided in separators 61, the configuration of which is more clearly shown in Figs. 8 and 9 of the drawings. The separator 61 also contains apertures 62 through which the mounting bolts 53 extend, as shown in Figs. 1 and 2 of the drawings.

Figure 10:
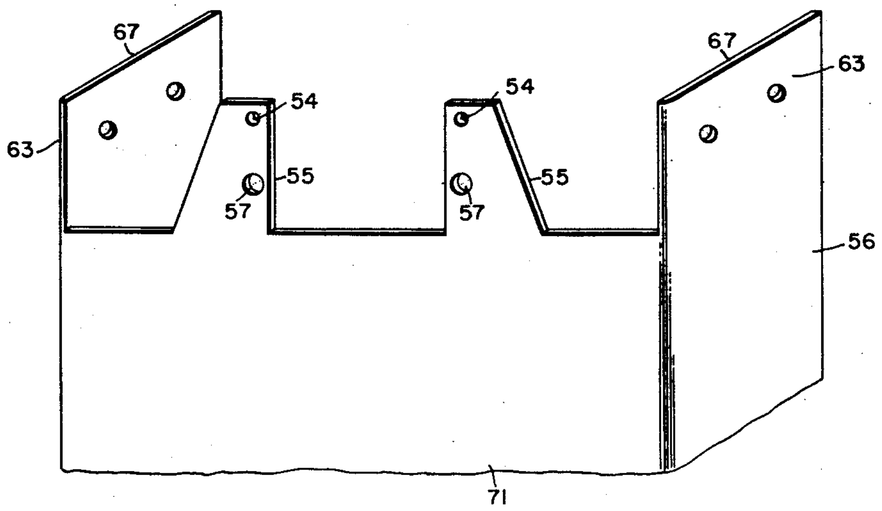
Fig. 10 is a fragmentary perspective view of the arc chute casing utilized in the circuit interrupter of Fig. 1.

From an inspection of Figs. 3 and 10, it will be apparent that the casing 56 has end portions 63 which close the ends of the arc chutes 3, 4. Also a pair of casing channel members 64, 65 are employed, which nest within the end walls 63 of the casing 56, as shown in Fig. 3. The side 66 of the insulating channel member 65 has tongue portions 55 (Fig. 2) similar to those shown in Fig. 10 associated with the channel-shaped casing member 56. The channel-shaped insulating casing member 64 extends upwardly, as shown in Fig. 2, to a level which meets the upper ends 67 (Fig. 10) of the casing 56, so that as viewed in Fig. 2, the arc chutes 3, 4 are completely separated. Moreover, the barrier plates 51 cause the exhaust gases to be diverted into substantially opposite directions, as indicated by the arrows 68 of Fig. 2.

The two separators for each arc chute 3, 4 assist in preventing external flashover, by dividing up the exhaust gases from each arc chute 3, 4 into three sections, "X," "Y" and "Z," as shown in Fig. 1. Thus the combination of the barrier plates 51 with the separators 61 insures a complete divergence of the exhaust arc gases issuing from the interrupter 1 to prevent any possibility of breakdown across the exhaust ends of the arc chutes 3, 4.

Figure 11:
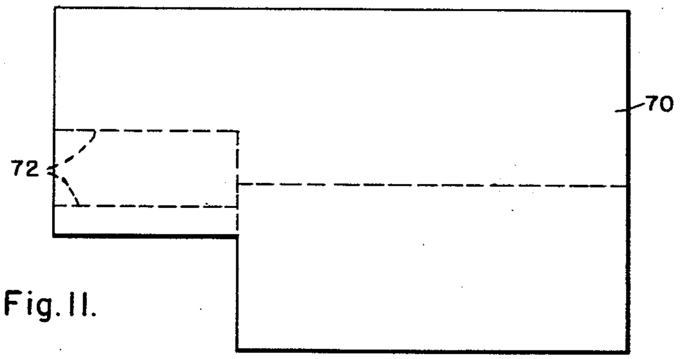
Figs. 11 and 12 are side elevational and end views of one of the arc barrier plates utilized in the circuit interrupter of Fig. 1.
Figure 12:
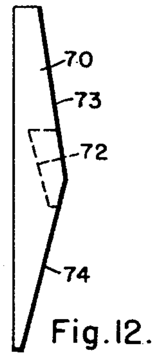
Figure 15:
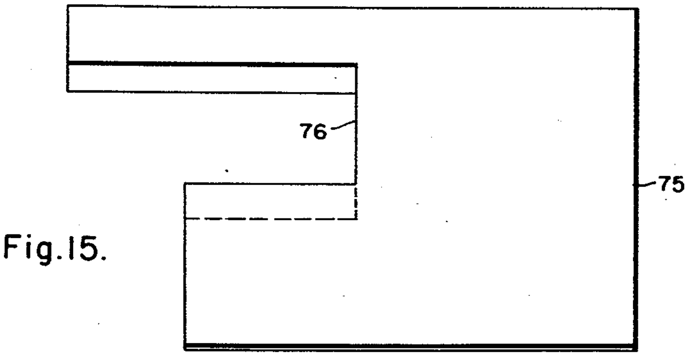
Figs. 15 and 16 are side elevational and end views of one of the arc guide plates used in the circuit interrupter of Fig. 1.
Figure 16:
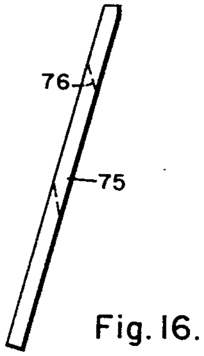
Figure 17:
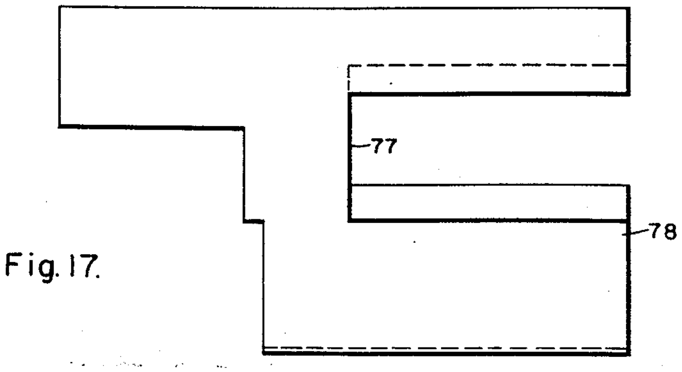
Figs. 17 and 18 are respectively side elevational and end views of the other arc guide plate utilized in the circuit interrupter of Fig. 1.
Figure 18:
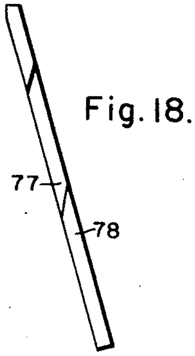

The plate structure adjacent the entrance portions 34 of the arc chutes 3, 4 will now be described. As shown in Fig. 2, an arc guide 70, shown more particularly in Figs. 11 and 12, is employed immediately inside the side 71 of the casing 56 adjacent the lower end thereof. The guide 70 has a slotted portion 72, which serves to hold one side of the transfer arc-extinguishing means 15, in the manner shown in Fig. 2 of the drawings. The barrier 70 has converging faces 73, 74, the face 73 leading into the entrance 34 of the arc chute 3. Immediately adjacent the face 74 of the barrier 70 is positioned an insulating deflecting plate 75, having a configuration as shown in Figs. 15 and 16 of the drawings. The deflecting plate 75 has a slotted portion 76, which interfits with a slotted portion 77 of a cooperating insulating deflecting plate 78, which is shown more clearly in Figs. 17 and 18 of the drawings.

Figure 13:
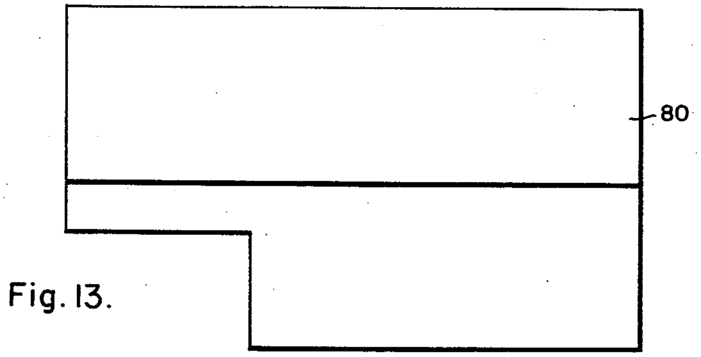
Figs. 13 and 14 are side elevational and end views of the cooperating arc barrier plate utilized in the circuit interrupter of Fig. 1.
Figure 14:
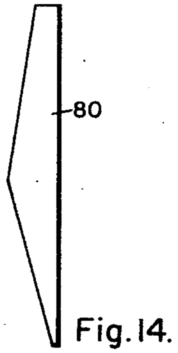

As shown in Fig. 2, the front arc horn 38 of the U-shaped arc horn structure 36 bends about at the loop portion 37 through the slot 76 of deflecting plate 75 and through the slot 77 of deflecting plate 78 to enter the rear arc chute 4. The cooperation between the deflecting plates 75, 78 insures that the arcs 40, 41 will enter the right arc chute. A second barrier 80, shown more particularly in Figs. 13 and 14 of the drawings, abuts adjacent the side wall 66 of the casing channel member 65 in a manner more clearly shown in Fig. 2 of the drawings. This cooperates with the deflecting plate 78 to insure that the arc portion 41 will enter properly into the rear arc chute 4 of the device.

From the foregoing, it will be apparent that with the arc chute structure, as shown in Figs. 1–3, a considerable length of arc is established in a very compact space, with both arc chutes 3, 4 utilizing the same transverse magnetic field, which passes between the pole plates 24. Thus the length of arc which is acted upon by the projecting edge portions of the ceramic material is substantially doubled without appreciable increase in the over-all length of the arc chute. The compact structure is highly effective, and the amount of iron necessary for the magnetic structure 23 is considerably reduced over what it would be for providing the necessary iron for pole plates for two arc chutes, each of which operated independently of the other. As a result, the interrupting capacity of circuit interrupters of current design may be considerably improved by applying the principles of my invention.

Also the subdivision of the arc gases, and the deflecting thereof in opposite direction, as caused respectively by the separators 61 and the barrier plates 51 insures a cooling of the arc gases, preventing the commingling thereof to eliminate the danger of external flashover across the upper ends of the arc chutes 3, 4.

Figs. 19–23 illustrate a modification of my invention particularly adapted to a center coil, or H-type of circuit interrupter, that is, one following the general principles set out in U. S. Patent 2,616,007, issued October 28, 1952, to Robert C. Dickinson and myself, and assigned to the assignee of the instant application. As well known by those skilled in the art, this type of circuit interrupter utilizes an H-type of magnet structure, with arc chute structures disposed on opposite sides of the core portion. The blowout coil encircling the core portion is at a floating potential, and is energized serially into the circuit during the opening operation.

Figure 19:
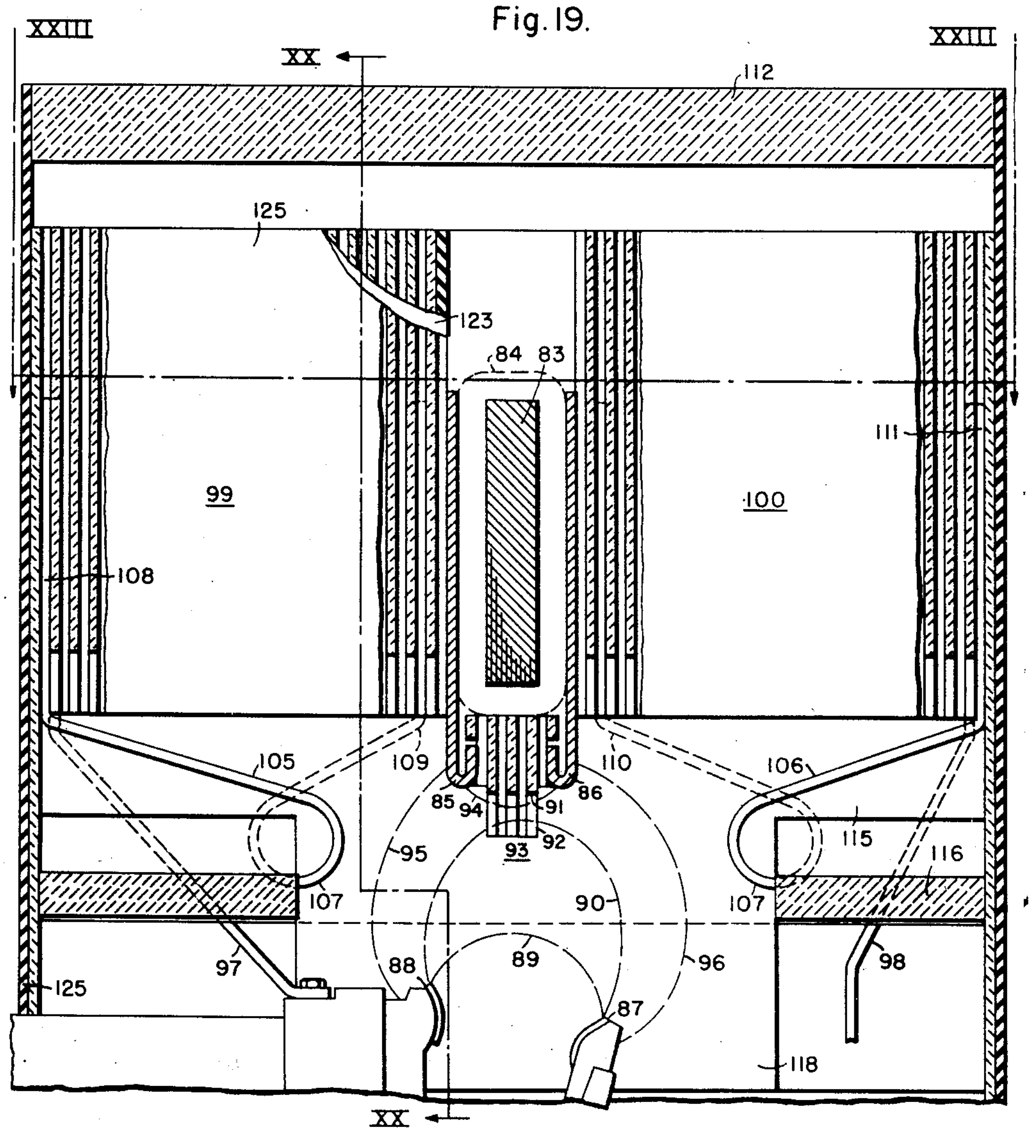
Fig. 19 is a substantially vertical sectional view taken along the line XIX—XIX of the modified type of circuit interrupter illustrated in Fig. 20.
Figure 23:
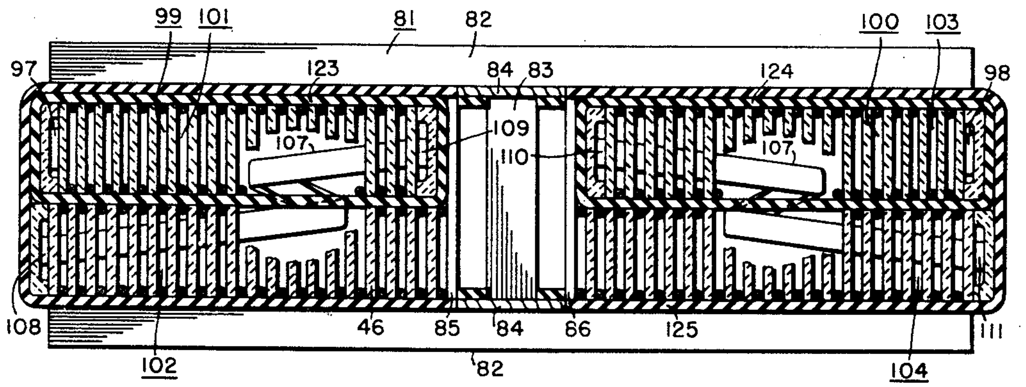
Figure 20:
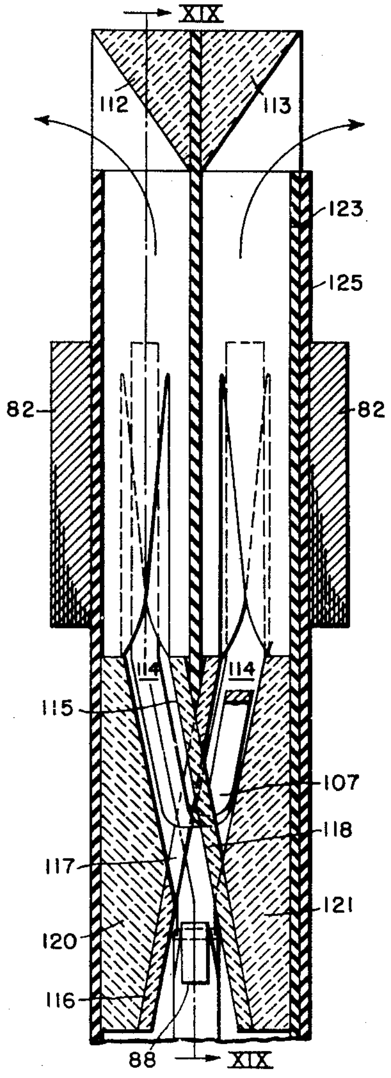
Fig. 20 is a substantially vertical sectional view taken along the line XX—XX of the modified type of circuit interrupter illustrated in Fig. 19.

With particular reference to Fig. 23 of the drawings, it will be observed that there is shown an H-type magnet frame designated by the reference numeral 81 and comprising a pair of pole plates 82 and an interconnecting central core portion 83. A pair of serially related blowout coils 84, are connected in series and have their end terminals connected between the transfer arc horns 85, 86, as shown in Fig. 19.

Thus, during the opening operation the movable contact 87 separates from the stationary contact 88, drawing an arc 89. The arc 89 bows upwardly to the position 90 where it enters into the slots 91 of a plurality of ceramic slotted plates 92, which collectively constitute a transfer arc-extinguishing means, generally designated by the reference numeral 93.

The arc 90 has the portion 94, extending between the transfer arc horns 85, 86 extinguished, and the remaining arc portions 95, 96 move outwardly into engagement with arc horns 97, 98, and into the arc extinguishing sections 99, 100.

Each arc extinguishing section 99, 100 is composed of two adjoining arc chutes 101, 102, 103, 104, as shown more clearly in Fig. 23 of the drawings. Two rectangular casings 123, 124 are disposed within a rectangular outer casing 125. Referring to Figs. 19 and 23 it will be observed that I have provided two substantially U-shaped arc-horn structures 105, 106, each of which has a loop portion 107, and end portions 108, 109, 110, and 111. The arc portions 95, 96 engage the loop portions 107 and are subdivided thereby into a total of four serially related arcs. Each arc moves upwardly into one of the arc chutes 101—104 and against the edge portions of the plates 46 in the manner previously described.

The upper ends of the arc chutes 101—104 have deflecting barrier plates 112, 113 associated therewith so that the exhaust arc gases may be deflected in substantially opposite directions to minimize the possibility of external flashover.

To segregate the arc portions adjacent the entrances 114 of the arc chutes 101—104 a deflecting plate structure is employed, shown in Figs. 21 and 22, and which will now be described.

Figure 21:
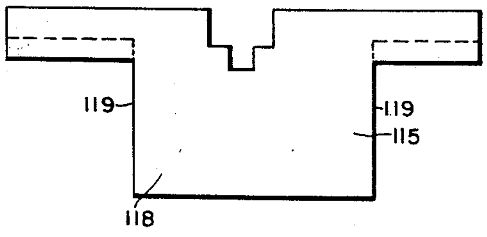
Figs. 21 and 22 are side elevational views of arc guide plates used in the modified type of circuit interrupter shown in Figs. 19 and 20; and, Fig. 23 is a plan view, in section, taken substantially along the line XXIII—XXIII of Fig. 19.
Figure 22:
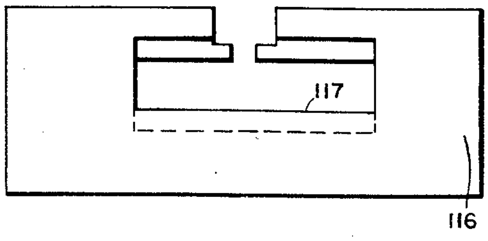

With particular reference to Figs. 21 and 22, it will be observed that there are shown interlocking plates 115, 116. The plate 116 has an elongated portion 117 removed therefrom to receive a projecting portion 118 associated with the deflecting plate 115, in the manner illustrated in Figs. 19 and 20. The arc horn structures 105, 106 have the loop portions 107 curved about the sides 119 of the tongue portion 118 of plate 115 in the manner shown in Fig. 19, so that the several arc portions are compelled to enter the proper arc chute 101—104.

The cooperating arc shield barriers 120, 121 (Fig. 20) may cooperate with the faces of the deflecting plates 115, 116 in a manner similar to that employed in the circuit interrupter of Figs. 1–3, previously described.

Thus Figs. 19–23 illustrate an application of the principles of my inventions to a center coil type of arc chute, in which pairs of adjoining arc chutes 101—104 are positioned on opposite sides of the core 83 of the magnet structure to utilize in a very compact space a considerable amount of arc length. As before, adjoining arc chutes utilize the same transverse magnetic field.

Thus the arc is extinguished by first dividing it into two sections with the blowout coil in series between the two sections. Each section is then divided into two parts which are electrically in series but positioned in parallel. The four arcs are moved outwardly against the edge portions of the ceramic material, and each arc is lengthened by the offset edge portions causing it to take a zig-zag path. This lengthening of the arcs, plus the cooling and deionizing effect of the edge portions and the flow of air through the four arc chutes induced by the magnetic field, causes extinction of the arcs.

The foregoing description shows how I have provided an improved circuit interrupter which is aimed to provide higher interrupting capacity in a given space and to obtain more positive arc control. The general scheme can be applied to the interrupters of the end coil design having a U-shaped magnet, or to a center coil design having an H-shaped magnet. The advantages to be gained by such a construction are a more compact arrangement, less iron required for the magnet, and better arc control.

The width of a breaker is determined largely by space required for bus work, pot heads, current and potential transformers, etc.; and this device can be designed to fit within the available width. It is obvious that if the arc chutes were placed end to end, instead of adjoining, as shown, considerable more depthwise room would be required. All of the flux in the interrupting space must go through the magnet poles and core, and since this design reduces the area in which this field must be maintained by 50%, the iron requirements are reduced in the same ratio.

Since the adjoining parallel arcs are close together and have current flowing in the same direction at any instant, the mutual magnetic attraction between the two arcs will tend to make them move together, keeping arc motion uniform in the adjoining chutes. Also in my improved design the arcs together with the horns of each U-shaped arc-horn structure, 36, 105, 106, form a two-turn coil, which will greatly augment the blowout force of the magnet.

Although I have shown and described specific structures, it is to be clearly understood that the same were merely for the purpose of illustration, and that changes and modifications may readily be made by those skilled in the art, without departing from the spirit and scope of the invention.

I claim as my invention:

1. A circuit interrupter including a pair of parallel disposed arc chutes, each arc chute having an entrance portion, means for establishing an arc, the entrance portion of each arc chute opening directly into the arc-establishing region, a substantially U-shaped arc horn having an intermediately disposed loop portion separate from the arc-establishing means and leading into opposite ends of the parallel disposed arc chutes from the entrance portions thereof to establish two serially related arc portions, the two serially related arc portions moving in side-by-side substantially parallel relationship through the parallel disposed arc chutes with the current therethrough flowing in generally the same direction, and each arc portion being extinguished within its own arc chute.

2. The combination in a circuit interrupter of a pair of side-by-side arc chutes, contact means including a movable contact for drawing an arc, each side-by-side arc chute having an entrance portion opening directly into the arc-drawing region, a substantially U-shaped arc horn having an intermediately disposed loop portion separate from the contact means and disposed adjacent the path of movement of the movable contact, the ends of said arc horn leading through said entrance portions into opposite ends of the side-by-side arc chutes so that two serially related arc portions may move in side-by-side substantially parallel relationship within the two arc chutes, and the current flowing through the two parallel disposed arc portions flowing in generally the same direction.

3. A circuit interrupter including a pair of side-by-side arc chutes each having an exhaust opening at one end thereof, means for establishing an arc within each arc chute so that the arcs move in side-by-side substantially parallel relationship within the side-by-side arc chutes, and deflecting means disposed adjacent the open exhaust ends of the arc chutes to deflect the exhaust gases in substantially opposite directions.

4. A circuit interrupter including a magnet frame having a pair of opposed pole plates and an interconnecting core portion, a pair of side-by-side arc chutes disposed between the pole plates, means for establishing an arc, each side-by-side arc chute having at one end thereof an entrance portion opening directly into the arc-establishing region and at the other end thereof an open exhaust portion, means for subdividing said established arc into two serially related arc portions and for moving one arc portion within each arc chute, and the two arc portions being moved by the same transverse magnetic field extending between the two pole plates in side-by-side substantially parallel relationship within the pair of side-by-side arc chutes.

5. The combination with a pair of parallel disposed arc chutes of a magnet frame having a U-shaped portion with legs substantially straddling the parallel disposed pair of arc chutes, each arc chute having an open entrance portion and an open exhaust portion, a substantially U-shaped arc horn having its ends extending through the open entrance portions to the opposite ends of the parallel disposed arc chutes, means for initially establishing an arc adjacent the two open entrance portions of the two parallel disposed arc chutes, and a pair of other arc horns disposed at the remaining opposite ends of the parallel disposed arc chutes.

6. The combination with a pair of side-by-side arc chutes of a magnet frame having a U-shaped portion with legs substantially straddling the side-by-side pair of arc chutes, each arc chute having an open entrance portion and an open exhaust portion, a substantially U-shaped arc horn having its ends extending through the open entrance portions to the opposite ends of the side-by-side arc chutes, means for initially establishing an arc adjacent the two open entrance portions of the two side-by-side arc chutes, a pair of other arc horns disposed at the remaining opposite ends of the arc chutes, and means for diverting the exhaust gases in substantially opposite directions at the open exhaust ends of the arc chutes.

7. A circuit interrupter including means for establishing an arc, a pair of side-by-side arc chutes having entrance portions opening directly into the arc-establishing region, each arc chute having an open exhaust portion opposite the entrance portion, a pair of notched plates interlocked in crossed relation in the arc-establishing region, said arc-establishing means including a movable contact movable between the crossed plates to establish an arc, and a substantially U-shaped arcing horn passing through the notches and extending through said entrance portions into opposite ends of the arc chutes with which the arc contacts to subdivide said arc into two serially related arc portions which move in side-by-side substantially parallel relationship within the side-by-side arc chutes.

8. A circuit interrupter including an H-type magnet frame, two parts of side-by-side arc chutes, one pair of side-by-side arc chutes being disposed between the legs of the magnet frame at one end thereof, and the other pair of side-by-side arc chutes being disposed between the legs of the magnet frame at the other end thereof, and means for establishing an arc in each arc chute.

9. A circuit interrupter including an H-type magnet frame, two pairs of side-by-side arc chutes, one pair of side-by-side arc chutes being disposed between the legs of the magnet frame at one end thereof, the other pair of side-by-side arc chutes being disposed between the legs of the magnet frame at the other end thereof, means for establishing an arc in each arc chute, and a U-shaped arcing horn associated with each pair of side-by-side arc chutes having one end thereof extending into one end of one arc chute and the other end extending into the other end of the other arc chute.

10. A circuit interrupter including a magnet frame having a pair of opposed pole plates and an interconnecting core portion, means for establishing an arc, a pair of side-by-side arc chutes disposed between said pole plates and each arc chute having an entrance portion opening directly into the arc-establishing region, an arcing horn separate from the arc-establishing means and having diverging portions which lead through said entrance portions into opposite ends of the side-by-side arc chutes for establishing two serially related arc portions therein, said arc portions moving in side-by-side substantially parallel relationship through the side-by-side arc chutes with the current therethrough flowing in generally the same direction, means for setting up a transverse magnetic field between said pole plates, and said magnetic field acting upon the two arc portions to effect their movement within the two arc chutes.

11. A circuit interrupter including a magnet frame having a pair of opposed pole plates and an interconnecting core portion, means for establishing an arc, a pair of side-by-side arc chutes disposed between said pole plates and each arc chute having at one end thereof an entrance portion opening directly into the arc-establishing region, each arc chute having at the opposite end thereof an exhaust opening, an arcing horn separate from the arc-establishing means and having diverging portions which lead through said entrance portions into opposite ends of the side-by-side arc chutes for establishing two serially related arc portions therein, said arc portions moving in side-by-side substantially parallel relationship through the side-by-side arc chutes with the current therethrough flowing in generally the same direction, means for setting up a transverse magnetic field between said pole plates, said magnetic field acting upon the two arc portions to effect their movement within the two arc chutes, and means for diverting the exhaust gases in different directions at the exhaust ends of said arc chutes.

12. A circuit interrupter including a pair of side-by-side arc chutes having entrance portions, each arc chute having insulating structure including a plurality of insulating offset edge portions, means for establishing an arc, a substantially U-shaped arc horn separate from the arc-establishing means and leading into opposite ends of the side-by-side arc chutes from the entrance portions thereof to establish two serially related arc portions, and each arc portion being compelled by the insulating offset edge portions to assume a zig-zag configuration to thereby become extinguished.

13. The combination in a circuit interrupter of a pair of side-by-side ceramic arc chutes, each arc chute having ceramic structure including edge portions disposed transversely of the length of the arc chute, contact means including a movable contact for drawing an arc, a substantially U-shaped arc horn separate from the contact means and disposed adjacent the path of movement of the movable contact, and the ends of said arc horn leading into opposite ends of the side-by-side arc chutes so that two serially related arc portions may move in substantially parallel relationship within the two arc chutes, and each arc being compelled by the edge portions to assume a sinuous shape to thereby become extinguished.

14. A circuit interrupter including means for establishing an arc, a pair of side-by-side arc chutes each having an entrance portion opening into the arc-establishing region, an arc horn separate from the arc establishing means and with which said established arc contacts, said arc horn having diverging portions which lead into opposite ends of the side-by-side arc chutes from the entrance portions thereof to establish two serially related arc portions, the two serially related arc portions moving in side-by-side substantially parallel relationship through the side-by-side arc chutes with the current therethrough flowing in generally the same direction, and each arc portion being extinguished within its own arc chute.

15. The combination in a circuit interrupter of contact means including a movable contact for establishing an arc, a pair of side-by-side arc chutes each having at one end thereof an entrance portion opening into the arc-establishing region, each arc chute having at the other end thereof an open exhaust portion, an arc horn separate from the contact means and with which said established arc contacts, said arc horn having diverging portions which lead into opposite ends of the side-by-side arc chutes from the entrance portions thereof to establish two serially related arc portions, the two serially related arc portions moving in side-by-side substantially parallel relationship through the side-by-side arc chutes with the current therethrough flowing in generally the same direction, and each arc portion being extinguished within its own arc chute.

16. The combination in a circuit interrupter of contact means including a movable contact for establishing an arc, a pair of substantially rectangularly-shaped side-by-side arc chutes each having at one end thereof an entrance portion opening into the arc-establishing region, each arc chute having at the other end thereof an open exhaust portion, an arc horn separate from the contact means and with which said established arc contacts, said arc horn having diverging portions which lead into opposite ends of the side-by-side arc chutes from the entrance portions thereof to establish two serially related arc portions, the two serially related arc portions moving in side-by-side substantially parallel relationship through the side-by-side arc chutes with the current therethrough flowing in generally the same direction, and each arc portion being extinguished within its own arc chute.

17. A circuit interrupter including means for establishing an arc, a pair of side-by-side arc chutes each having an entrance portion opening into the arc-establishing region, an arc horn separate from the arc establishing means and with which said established arc contacts, said arc horn having diverging portions which lead into opposite ends of the side-by-side arc chutes from the entrance portions thereof to establish two serially related arc portions, the two serially related arc portions moving in side-by-side substantially parallel relationship through the side-by-side arc chutes with the current therethrough flowing in generally the same direction, a plurality of transversely disposed insulating plate portions within each arc chute, and each arc portion being extinguished within its own arc chute.

18. A circuit interrupter including contact means including a movable contact for establishing an arc, a pair of substantially rectangularly-shaped arc chutes each having an entrance portion opening directly into the arc-establishing region, a substantially U-shaped arc horn separate from the contact means and having the bight portion thereof substantially half way between the ends of the two arc chutes, the bight portion of said arc horn being disposed adjacent the path of movement of the movable contact, the ends of said U-shaped arc horn leading into opposite ends of the side-by-side rectangularly-shaped arc chutes, other arc horns disposed at the other ends of the side-by-side arc chutes so that two serially related arc portions may move in side-by-side substantially parallel relationship through the pair of arc chutes with the current through the arc portions flowing in the same general direction, and each arc portion being extinguished within its own arc chute.

References Cited in the file of this patent

UNITED STATES PATENTS

| | | |
|---|---|---|
| 1,713,229 | Hewlett | May 14, 1929 |
| 2,293,513 | Linde | Aug. 18, 1942 |
| 2,436,189 | Boehne | Feb. 17, 1948 |
| 2,611,058 | Rawlins | Sept. 16, 1952 |
| 2,616,007 | Dickinson et al. | Oct. 28, 1952 |
| 2,668,890 | Latour | Feb. 9, 1954 |